United States Patent [19]
Sano et al.

[11] 4,359,769
[45] Nov. 16, 1982

[54] SIGNAL REPRODUCTION APPARATUS

[75] Inventors: Kazuhiko Sano, Suita; Shoji Ohmiya, Shijyonawate, both of Japan

[73] Assignee: Matsushita Electric Industrial Co., Ltd., Kadoma, Japan

[21] Appl. No.: 146,250

[22] Filed: May 5, 1980

[30] Foreign Application Priority Data

| May 8, 1979 | [JP] | Japan | 54-55985 |
| Oct. 22, 1979 | [JP] | Japan | 54-136743 |
| Nov. 26, 1979 | [JP] | Japan | 54-163847 |

[51] Int. Cl.³ ............................................. G11B 3/58
[52] U.S. Cl. ......................................................... 369/74
[58] Field of Search .................................. 369/72, 74

[56] References Cited

U.S. PATENT DOCUMENTS

| 2,340,806 | 2/1944 | Green | 369/74 |
| 3,652,809 | 3/1972 | Dickopp et al. | 179/100.4 R |
| 4,037,253 | 7/1977 | Nagaoka | 358/128 |
| 4,145,718 | 3/1979 | Dholakia et al. | 358/128 |
| 4,173,348 | 11/1979 | Dholakia | 369/74 |

FOREIGN PATENT DOCUMENTS

2406275 6/1979 France ................................. 369/72

*Primary Examiner*—Harry N. Haroian
*Attorney, Agent, or Firm*—Cushman, Darby & Cushman

[57] ABSTRACT

A signal reproduction apparatus comprising a pick-up means with a playback stylus tracing on engraved grooves of a record disk and a shaving means abutting on only the top portions of several number of the engraved grooves, wherein the shaving means effectively scrapes dust on the disk surface during the tracing movement in advance of the tracking motion of the playback stylus along the engraved grooves.

10 Claims, 11 Drawing Figures

SIGNAL REPRODUCTION APPARATUS

BACKGROUND OF THE INVENTION

1. Field of the Invention

This invention relates to an improvement in a signal reproduction apparatus, by which electric signals are reproduced from a record disk.

2. Prior Arts

A signal reproduction apparatus by use of a record disk, on which a large number of circular grooves are formed has been disclosed in, for example, U.S. Pat. Nos. 3,652,809 for Dickopp et al., 4,037,253 for Nagaoka, and 4,145,718 for Dholakia et al. The record disk is provided with a large number of guide grooves either in a spiral form or a concentric circular form. The bottom and/or the walls of the guide grooves are modulated by means of signals, such as video signals including sound signals, so as to mechanically store the signals in the form of engraved patterns. When reproducing the recorded signals, the record disk groove is traced thereby detecting the displacement of a playback stylus caused by the engraved patterns, or detecting changes of an electrostatic capacity between an electrode provided on the stylus and an engraved patterned conductor provided under a smooth plastic layer over the groove patterns. In such record disk reproducing apparatuses, there arise problems due to dust attached to the surface of the record disk. The dust in the air is likely to absorb moisture and/or oil, and become strongly attached to the record disk surface. It is liable to obstruct the tracking motion of the playback stylus and cause jumping of the playback stylus. In the currently used video disks, the pitch interval of the recording tracks is usually in the range of only several microns, and therefore one jumping motion of the playback stylus, even if a slight one, makes for considerable reproduction failure of the signals recorded in the several recording tracks.

In addition, the foreign matters consisting of the dust and a lubricant material coating the record disk surface often occupy the engraved grooves, and therefore, so-called locked grooves are formed. Once the locked groove is formed, the playback stylus repeatedly traces the same recording track and the reproduced video image becomes a still image.

Conventionally, in order to avoid such troubles, it has been proposed to provide a pre-play stylus which scans on the surface of the recording disk in advance of the playback stylus, so as to remove the foreign matters occupying the engraved grooves by the pre-play stylus. In a conventional apparatus, a pre-play stylus (hereinafter referred to as a shaving means) made of a hard material such as diamond or sapphire has several teeth for engaging with the grooves formed on the surface of a recording disk.

The present inventors studied the tracking motion of such a conventional shaving means and found the following problems. The conventional shaving means removes the foreign matters attached to the recording disk surface, but it also shaves to some extent the walls and bottoms of the grooves thereby spoiling the quality of the recorded signal pattern. It is naturally true that all of the recorded signal patterns are not necessarily shaved at once, but the signal to raise ratio decreases earlier in the midway of the life time of the recording disk as compared to the case when the reproduction is made only by a playback stylus without a shaving means. It was also revealed after the life test of recording disks that the recorded signals were no more accurately reproduced without drop-out of signals at an earlier stage of the life, when the signal reproduction is carried out by a playback stylus together with a shaving means with several teeth.

Further, the present inventors studied the tracking motion by use of a shaving means having a more gentle angle at the tip of the teeth than that of the grooves. Such a shaving means is employed in order to decrese the contact area of the teeth with the walls of the grooves. But it was revealed that the teeth were soon rubbed by the walls of the engraved grooves resulting in a teeth shape having the same tip angle as that of the grooves, and that the worn teeth scrubbed the engraved walls of the grooves.

On the other hand, a conventional video disk, depending on the type, is provided with a thin coating layer of a lubricant on the surface thereof in order to decrease the abrasion of the playback stylus and the record disk. It was revealed in the test of applying a shaving means with teeth for such a record disk that the shaving means scrubbed the lubricating coating layer and that the playback stylus and the record disk were remarkably abraded. It is easily understood that the abrasion of the recorded signal patterns in the grooves and the scrubbing of the lubricating coating layer are accelerated when the number of the teeth at the shaving means becomes large, since the grooves are scrubbed as many times as the number of the teeth.

SUMMARY OF THE INVENTION

The present invention provides a signal reproduction apparatus comprising a shaving means which is devised to effectively remove foreign matters such as dust attached to the surface of a record disk without spoiling the walls of the circular grooves on the surface.

DETAILED DESCRIPTION OF THE PREFERRED EMBODIMENTS

The present invention provides a signal reproduction apparatus comprising
- a driving means for rotating a record disk having a large number of engraved grooves as record tracks,
- a pick-up means comprising a playback stylus tracing on said engraved grooves of said record disk thereby reproducing electrical signal responding to said engraved grooves,
- a shaving means for abutting on only the top portions of several numbers of said engraved grooves, and
- a carrying means for moving said pick-up means and said shaving means in such a manner that said playback stylus traces along said engraved grooves after said shaving means traces on said top portions of said engraved grooves.

Figure 1:
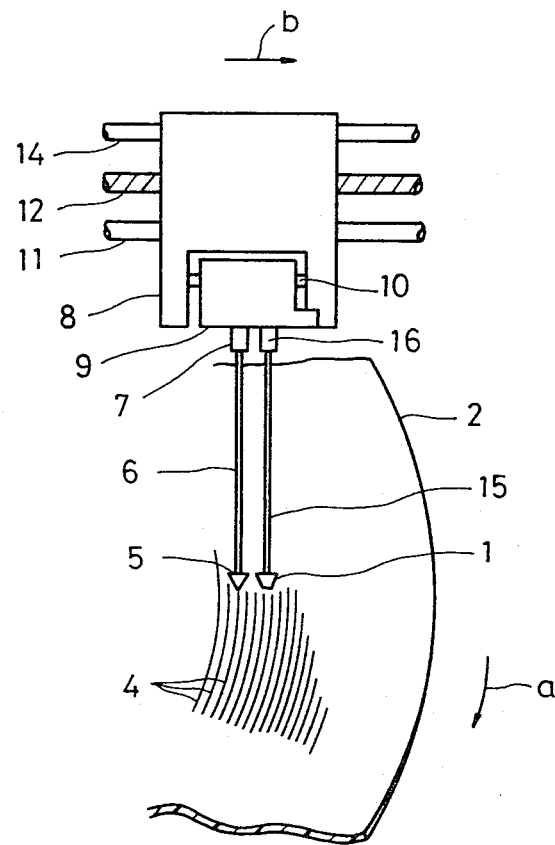
FIG. 1 is a perspective view showing a first embodiment of a signal reproduction apparatus in accordance with the present invention.

FIG. 1 is a perspective view showing a first embodiment of a signal reproduction apparatus constructed in accordance with the present invention. A record disk 2 has a large number of engraved grooves 4 on the surface thereof in a spiral form. It rotates in a rotating direction indicated by an arrow "a". A playback stylus 5 is fixed at the tip of a pick-up arm 6. The pick-up arm 6 is mounted on a holding means 9 by means of an elastic material 7. A shaving means 1 is fixed at the tip of a holding arm 15. The holding arm 15 is similarly mounted on the holding means 9 by means of an elastic material 16. The holding means 9 has a shaft 10 rotatably held on a carriage 8 so as to make the playback stylus abut on the grooves 4, or to place the playback stylus apart from the disk surface. Guide rails 11 and 14 guide the movement of the carriage 8. A screw thread 12 rotated by a driving means such as a motor (not shown) is used to scan the carriage 8 in the axial direction of the guide rails indicated by an arrow "b".

The abovementioned structure of the signal reproduction apparatus is similar to a conventional apparatus. The signal reproduction apparatus embodying the present invention is also applicable to a disk-shaped recording medium having video and audio information recorded by means of geometric variations in the bottom of a smooth spiral groove on the surface thereof. Such a groove is coated with a layer of a conductive material which, in turn, is coated with a layer of a dielectric material. The signal reproduction apparatus of the first embodiment employes a scanning method wherein the playback stylus 5 scans from the central part towards the peripheral part. But the scanning direction is not limited to this case. In this embodiment, the holding arm 15 for holding the shaving means 1 is provided adjacent the pick-up arm 6 in such a manner that the holding arm 15 runs on the grooves 4 in advance of the tracking of the playback stylus 5. It is also in practice possible to dispose the shaving means 1 on a place of about the same radius, where the shaving means 1 scans on the grooves 4 in advance of the playback stylus 5.

Figure 2:
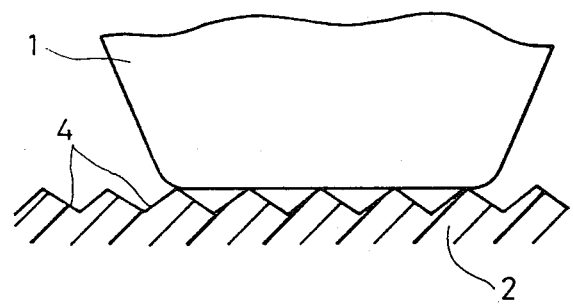
FIG. 2 is an enlarged front view schematically showing a structural example of a shaving means embodying the present invention.

FIG. 2 is an enlarged front view of a first example of a shaving means used for a signal reproduction apparatus embodying the present invention. A front face of a shaving means 1 is shown in FIG. 2 as seen from a direction parallel to a tangential direction of grooves 4 on the surface of a record disk 2. The shaving means 1 is made of a hard material such as diamond or sapphire. Electrical signals are mechanically recorded in the grooves 4 in a form of engraved patterns. A flat bottom of the shaving means 1 spans on several ridge portions at the top of the grooves 4. Therefore, it does not directly contact the engraved record patterns in the grooves 4 and thus the patterns are not hurt by the sweeping motion of the shaving means 1 on the grooves 4. In addition, since the shaving means 1 does not directly engage with the grooves 4, it can move in radial directions on the disk surface even when eccentric rotation of the record disk 2 exists since the bottom face of the shaving means 1 uniformly contacts the ridge portions of the grooves 4. Accordingly, it is not abraded by the ridge portions of the grooves 4.

The shaving means 1 of the first example has a flat face at the bottom face thereof, except the side portions where circular arc regions are provided. A feature of a shaving means used for a signal reproduction apparatus is characterized by the structure of the shaving means such that the contact pressure thereof with the ridge portions is uniformly divided on several ridge portions. As can be seen from FIG. 2, even if the ridge portions are abraded a little, the signal reproduction can accurately be made. Furthermore, by making the total contact pressure of the shaving means 1 against the ridge portions smaller than that of the playback stylus, it is almost possible to eliminate the abrasion of the ridge portions by the shaving means 1.

Figure 3:
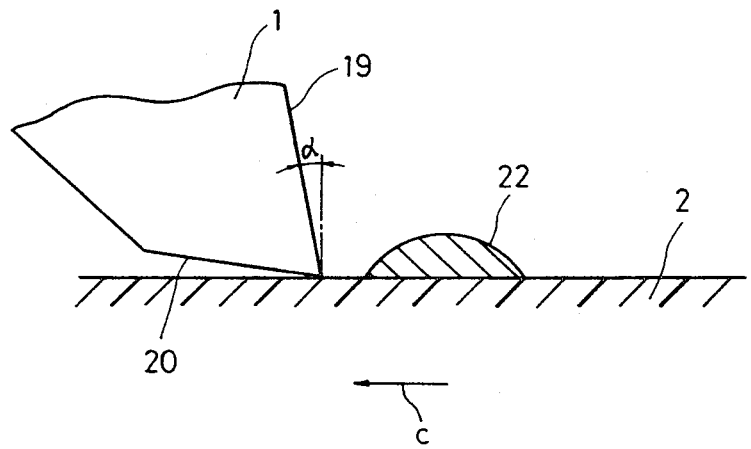
FIG. 3 is an enlarged side view schematically showing another structural example of a shaving means embodying the present invention.

FIG. 3 is an enlarged side view showing a second example of a shaving means used for a signal reproduction apparatus embodying the present invention. A side face of a shaving means 1 is shown in FIG. 3 as seen from a direction perpendicular to a tangential direction of a groove. A shaving means 1 removes foreign matters 22 such as dust adhering to the surface of a record disk 2, which rotates in a direction indicated by an arrow "c". The shaving means 1 of this example has a front face 19 making an acute angle $\alpha$ with a normal plane of the disk surface. The front face 19 with the acute angle can improve a shaving capability of the shaving means 1.

Experimental results revealed that it was preferable to select the acute angle $\alpha$ between 3°–10°. It is further possible to provide a relief face 20 at the bottom part of the shaving means 1. The scraping capability is further improved by the existence of the relief face 20. Further, since the shaving means 1 contacts the disk surface with a straight line formed by the intersection of the front face 19 with the relief face 20, which straight line is disposed perpendicular to the tangent of the groove, a stable contact condition against the record disk 2 is always obtainable, even if the supporting angle of the shaving means 1 is changed a little and/or the disk surface deflects in a vertical direction (with respect to the plane in which a turntable surface lies).

Figure 4A:
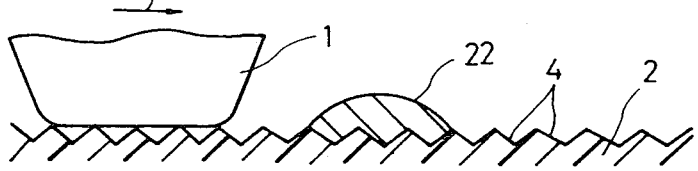
FIG. 4(a)–FIG. 4(c) are schematic enlarged front views showing the way a shaving means embodying the present invention removes dust on a record disk.
Figure 4B:
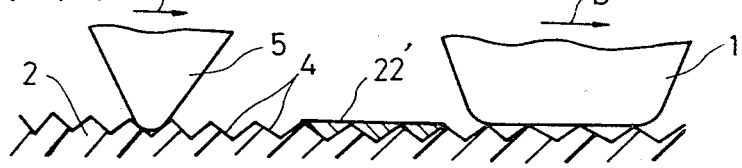
Figure 4C:
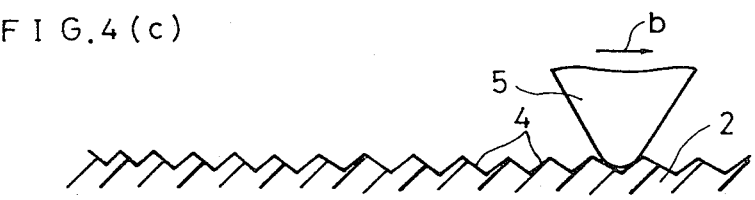

The operation of the signal reproduction apparatus of the first embodiment is elucidated by referring to FIGS. 4(a)–4(c). FIG. 4(a) to FIG. 4(c) are enlarged front views schematically showing the scraping motion of a shaving means 1 and the tracking motion of a playback stylus 5, as seen from a direction parallel to a tangential line of grooves 4. The shaving means 1 and the playback stylus 5 move in a radial direction indicated by an arrow "b". FIG. 4(a) shows the shaving means 1 approaching foreign matters on the grooves 4. The shaving means 1 scrapes the foreign matters 22 thereby leaving debris 22' inside the grooves 4 as shown in FIG. 4(b). Subsequently, the playback stylus 5 tracks the grooves 4 by pushing aside the debris 22', as shown in FIG. 4(c). The tracking of the playback stylus 5 is carried out without skipping several groove convolutions, since the debris 22' does not exert enough force to deflect the playback stylus 5 out of engagement with the grooves 4.

This is confirmed by experimental observations conducted by the present inventors. The debris 22' remaining in the grooves 4 is then easily scraped away by the playback stylus 5. The shaving means 1 used for a signal reproduction apparatus embodying the present invention has distinctive features that the shaving means 1 can scrape away the foreign matters attached to the disk surface without damaging the recorded patterns on the groove walls, and that the conventional problems such as skipping of the playback stylus and locked groove incidents can be prevented.

The signal reproduction apparatus of FIG. 1 employs the structure wherein the playback stylus 5 and the shaving means 1 are respectively fixed to different arms. This structure has the following merits as compared to a structure where a playback stylus and a shaving means are held by a single arm:

In case such a single arm is employed, the skipping of the playback stylus is liable to occur, since the playback stylus directly receives mechanical shocks when the shaving means scrapes foreign matters on the disk surface. Such troubles remarkably occur when the foreign matters are rigidly attached to the disk surface. On the contrary, by adopting the construction of holding the playback stylus and the shaving means separately by two arms as shown in FIG. 1, the playback stylus can stably track along the grooves without the influence of the shaving means.

Further, in the structure of the signal reproduction apparatus, the pick-up arm 6 and the holding arm 15 are supported by the holding means 9, which is movably held at the carriage 8. That means, both arms are simultaneously shifted to or from the disk surface. The shaving means 1 abuts on the disk surface only when the playback stylus is used for the signal reproduction.

The compliance of the pick-up arm 6 is selected by the elastic material 7 in such a manner that the traceability of the playback stylus 5 along the grooves is optimized. The traceability means how well the playback stylus 5 can track the grooves and respond to the mechanically engraved record patterns in the grooves irrespective of the eccentricity of the disk rotation and the displacement of the disk surface in vertical directions. The traceability of the shaving means 1 along the disk surface can be made best by setting the compliance of the holding arm 15 in the vertical direction equal to that of the pick-up arm 6 in the vertical direction. The compliance of the holding arm 15 in a horizontal direction (parallel to the disk surface) need not be set equal to the counterpart of the playback stylus 5, since the shaving means 1 does not have to strictly track the grooves like the playback stylus 5. It is possible to increase the scraping efficiency of the shaving means 1 by selecting the compliance of the holding arm 15 in the horizontal direction smaller than that of the pick-up arm 6. This means that the holding arm 15 is more hardly deflected in the horizontal direction of the existence of the foreign matters.

Figure 5:
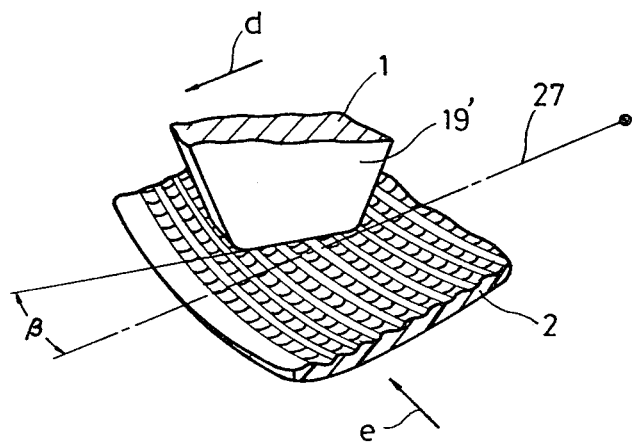
FIG. 5 is a perspective view showing still another structural example of a shaving means embodying the present invention.

FIG. 5 is a perspective veiw showing still another structural example of a shaving means embodying the present invention. A shaving means 1 shifts in a radial direction indicated by an arrow "d" on the surface of a record disk 2, which rotates in a direction indicated by an arrow "e". A front face 19' of the shaving means 1 makes an angle of β with a radial line 27 passing along one tip of the front face 19'. Usually, dust and/or debris scraped by a shaving means is accumulated at the front face thereof. And when the accumulation amount becomes much, the scraping efficiency is lowered or the shaving means is liable to be lifted by the dust coming into the space under the shaving means. But, the shaving means 1 of FIG. 5 can push the scraped dust in the radial direction by the inclined front face 19'. Therefore, the accumulation amount of the scraped dust by the front face 19' is limited to a certain extent. Furthermore, since the front face 19' is inclined so as to push the scraped dust aside in the radial direction, i.e. to the side opposite to the tracking position of a playback stylus (not shown), the scraping motion of the shaving means 1 does not affect the tracking motion of the playback stylus. In FIG. 5, the scanning of a carriage is made from an inward to an outward position on the disk surface and the scraped dust is always pushed away in an outward direction. The dust is finally pushed out outside the tracking zone. In case that the carriage is scanned in the opposite direction, the scraped dust is finally pushed out outside the tracking zone at the most inward circular orbit.

Figure 6:
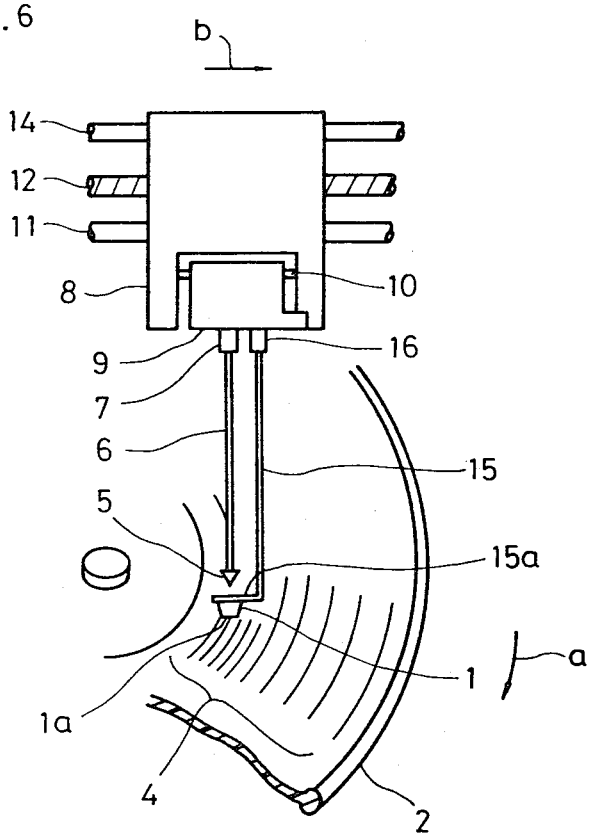
FIG. 6 is a perspective view showing a second embodiment of a signal reproduction apparatus in accordance with the present invention.

FIG. 6 is a perspective view showing a signal reproduction apparatus of a second embodiment constructed in accordance with the present invention. The signal reproduction apparatus of FIG. 6 has a similar structure to that of FIG. 1, except for a holding arm 15. Although the holding arm 15 holds a shaving means 1 disposed almost parallel to a pick-up arm 6, a tip 15a of the holding arm 15 is bent so as to make a right angle with its main part. The shaving means 1 is disposed at the tip 15a of the holding arm 15 in such a manner that a corner part 1a of the shaving means 1 lies on the same radial position as the playback stylus. The corner part 1a is on the side with respect to the holding arm 15 that is opposite to a carrying direction of a carriage 8 indicated by an arrow "b". The shaving means 1 preferably possesses a width lying over several tracking grooves, e.g. 20 grooves.

Figure 7:
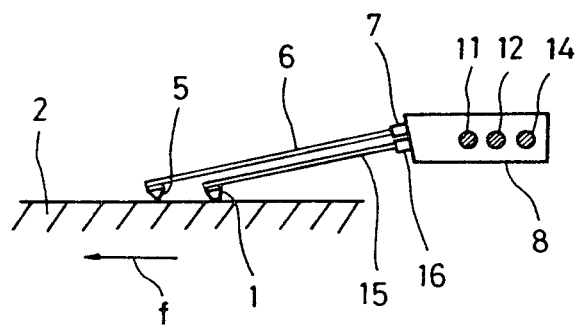
FIG. 7 is a side view showing principal portions of a third embodiment of a signal reproduction apparatus in accordance with the present invention.

FIG. 7 is a perspective view showing a signal reproduction apparatus of a third embodiment constructed in accordance with the present invention. It employs a structure wherein a carriage 8 holds a pick-up arm 6 at a position higher than a holding position of a holding arm 15. By employing such a construction, it is also possible to place a shaving means 1 on a radial position the same as the tracking position of a playback stylus 5, like the case in FIG. 6. In such a signal reproduction apparatus, the tracking groove to be tracked by the playback stylus 5 is already scraped by the shaving means 1 at the same time of the beginning of the signal reproduction.

Figure 8:
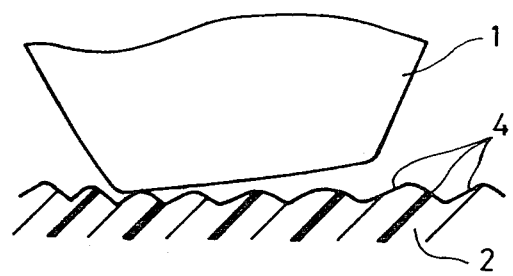
FIG. 8 is a enlarged front view of a shaving means with the tilted bottom face on a record disk.

FIG. 8 is an enlarged front view of a shaving means illustrating a tilting state. If a holding arm for holding a shaving means 1 is tilted or the shaving means 1 is erroneously mounted on a carriage by slipping out of a correct holding place, the case illustrated in FIG. 8 results. Then, the shaving means is no more accurately placed on the disk surface. The bottom face of the shaving means 1 abuts nonuniformly on the tops of ridges of grooves 4, and therefore the scraping efficiency of the shaving means 1 is lowered. In this case, the record disk is liable to be damaged since the total load is applied to a limited small area. Although the shaving means is made of a hard material such as diamond and sapphire, the abutting portion is rapidly abraded. In order to avoid such troubles, it is proposed to employ a modified type of a shaving means.

Figure 9:
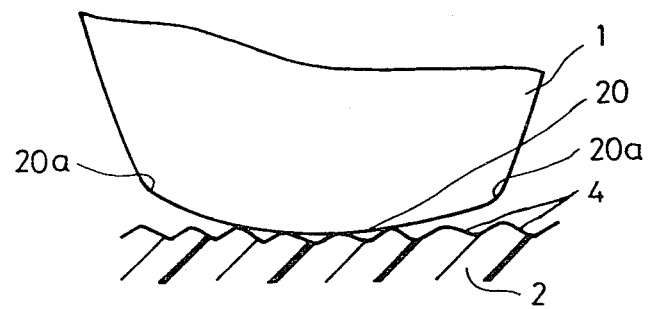
FIG. 9 is an enlarged front view of still another structural example of a shaving means embodying the present invention.

FIG. 9 is an enlarged front view of such a modified structural example of a shaving means used for a signal reproduction apparatus embodying the present invention. A shaving means 1 has bottom face 20 of a circular arc form. The bottom face 20 has side portions 20a of small curvature. The shaving means 1 abuts on the ridge portions of grooves 4 at central portions thereof. Even though the contact pressure of the shaving means at the central portions is higher than that of the peripheral portions, the shaving means 1 is designed to stress the central portions thereof well within an elastic limit of a material of the record disk. Although the shaving means 1 abuts on only several of the grooves 4 in the schematic view in FIG. 9, in a practical case this number is on the order of 20-50 convolutions.

In the case of the shaving means 1 in FIG. 9, even if the abutting face is tilted out of a correct position a little, an appropriate contact condition is always obtainable. Therefore, it is possible to employ large clearance values in fixing the shaving means at the tip of the holding arm and mounting the holding arm on the carriage. This means that production and construction of the signal reproduction apparatus becomes much easier.

Furthermore, since the contact pressure of the shaving means 1 at the central portions thereof is high, the scraping efficiency is improved thereby effectively removing the dust and debris of the disk material strongly attached to the disk surface. Further, the side portions 20a are lifted upwards, and thus the shaving means 1 does not damage the disk surface, even if it is largely tilted during the scraping motion.

As so far described, a signal reproduction apparatus embodying the present invention is used to reproduce signals from the record disks with engraved grooves. But, it is also possible to employ it to reproduce signals from a record disk, on which signals are stored in a form of bit patterns.

What we claim is:

1. A signal reproduction apparatus comprising:
    a driving means for rotating a record disk having a large number of engraved grooves as record tracks,
    a pick-up means comprising a playback stylus for tracing on said engraved grooves of said record disk thereby reproducing electrical signals responding to said engraved grooves,
    a shaving means comprised of a hard material for abutting on only the top portions of a predetermined number of ridges formed between said engraved grooves, and
    a carrying means for moving said pick-up means and said shaving means in such a manner that said playback stylus traces along said engraved grooves after said shaving means runs on said top portions of said engraved grooves,
    and wherein the abutting surface of said shaving means has a curved edge of a circular arc form such that said shaving means abuts the top portions of the same predetermined number of ridges despite misalignment of said carrying means.

2. A signal reproduction apparatus in accordance with claim 1, wherein said shaving means makes an acute angle at the front face thereof with a normal plane of the disk surface.

3. A signal reproduction apparatus in accordance with claim 1, wherein said shaving means abuts on the record disk surface with a lower edge of a front face line making a predetermined angle with respect to a radial direction of said record disk at the abutting place.

4. A signal reproduction apparatus in accordance with claim 1, wherein said shaving means makes an acute angle at the front face thereof with a normal plane of the disk surface and has a relief angle at the bottom face thereof.

5. A signal reproduction apparatus in accordance with claim 1, wherein a contact pressure of said shaving means against said record disk is smaller than that of said playback stylus.

6. A signal reproduction apparatus in accordance with claim 1 further comprising a holding arm for holding said shaving means at the tip thereof and a pick-up arm for holding the playback stylus at the tip thereof, wherein
    said holding arm and said pick-up arm are held at said carrying means in such a manner that they are disposed in a direction parallel to a tangential direction of said engraved grooves.

7. A signal reproduction apparatus in accordance with claim 6, wherein said holding arm being disposed parallel to said pick-up arm has a tip portion bent perpendicularly to the main portion of said holding arm, thereby disposing said shaving means at a radial position covering a tracking position of said playback stylus.

8. A signal reproduction apparatus comprising:
    a driving means for rotating a record disk having a large number of engraved grooves as record tracks,
    a pick-up means comprising a playback stylus for tracing on said engraved grooves of said record disk thereby reproducing eletrical signals responding to said engraved grooves,
    a shaving means comprised of a hard material for abutting on only the top portions of several number of ridges formed between said engraved grooves,
    a carrying means for moving said pick-up means and said shaving means in such a manner that said playback stylus traces along said engraved grooves after said shaving means runs on said top portions of said engraved grooves,
    a holding arm for holding said shaving means at the tip thereof,
    a pick-up arm for holding the playback stylus at the tip thereof,
    said holding arm is mounted on the carrying means by a first elastic member and has a compliance in both a vertical and a horizontal direction, and
    said pick-up arm is mounted on the carrying means by a second elastic member and has a compliance in both a vertical and a horizontal direction, wherein the vertical compliance of said holding arm is nearly equal to that of said pick-up arm, and the horizontal compliance of said holding arm is smaller than that of said pick-up arm.

9. A signal reproduction apparatus in accordance with claim 8, wherein said shaving means abuts on the record disk surface with a line parallel to the surface of said record disk.

10. A signal reproduction apparatus comprising:
    a driving means for rotating a record disk having a large number of engraved grooves as record tracks,
    a pick-up means comprising a playback stylus for tracing on said engraved grooves of said record disk thereby reproducing electrical signals responding to said engraved grooves,
    a shaving means comprised of a hard material for abutting on only the top portions of several number of ridges formed between said engraved grooves, a carrying means for moving said pick-up means and said shaving means in such a manner that said playback stylus traces along said engraved grooves after said shaving means runs on said top portions of said engraved grooves, and a holding arm for holding said shaving means at the tip thereof and a pick-up arm for holding the playback stylus at the tip thereof, wherein said holding arm and said pick-up arm are held at said carrying means in such a manner that they are disposed in a direction parallel to a tangential direction of said engraved grooves, and further wherein said carrying means holds said pick-up arm at a position above said holding arm.

* * * * *